United States Patent [19]
Laroche

[11] Patent Number: 4,713,295
[45] Date of Patent: Dec. 15, 1987

[54] METHOD OF MODIFYING THE WETTABILITY OF GLASS BEADS, GLASS BEADS POLYMERIC MATERIAL INCORPORATING SUCH GLASS BEADS, AND METHOD OF APPLYING REFLECTIVE MARKINGS TO A SURFACE

[75] Inventor: Pierre Laroche, Nalinnes, Belgium

[73] Assignee: Glaverbel, Brussels, Belgium

[21] Appl. No.: 844,315

[22] Filed: Mar. 26, 1986

[30] Foreign Application Priority Data

Mar. 28, 1985 [GB] United Kingdom ................. 8508093

[51] Int. Cl.[4] .......................... B05C 1/16; B05D 7/00; B32B 5/16; C03C 17/00
[52] U.S. Cl. ..................................... 428/406; 65/60.3; 427/137; 427/221; 427/204; 428/407
[58] Field of Search ....................... 427/221, 137, 204; 428/405, 406, 407; 65/60.3

[56] References Cited

U.S. PATENT DOCUMENTS

| | | | |
|---|---|---|---|
| 3,222,204 | 12/1965 | Weber et al. | 65/60.3 X |
| 3,286,604 | 11/1966 | de Vries | 428/407 X |
| 3,769,126 | 10/1973 | Kolek | 428/325 X |
| 4,248,932 | 2/1981 | Tung et al. | 428/405 X |
| 4,609,587 | 9/1986 | Giordano et al. | 428/406 X |

*Primary Examiner*—Michael R. Lusignan
*Attorney, Agent, or Firm*—Spencer & Frank

[57] ABSTRACT

This invention relates to coating glass beads with a mixture of substances which mixture comprises a first substance which if used alone would tend to make the beads hydrophobic while leaving them oleophilic and as second substance which if used alone would tend to make the beads both hydrophobic and oleophobic. Said coated beads maybe used in a synthetic polymeric matrix, as a coating over paint and as a coating on a road surface.

21 Claims, No Drawings

METHOD OF MODIFYING THE WETTABILITY OF GLASS BEADS, GLASS BEADS POLYMERIC MATERIAL INCORPORATING SUCH GLASS BEADS, AND METHOD OF APPLYING REFLECTIVE MARKINGS TO A SURFACE

BACKGROUND OF THE INVENTION

1. Field of the Invention

This invention relates to a method of modifying the wettability of glass beads, to glass beads, to a synthetic polymeric matrix incorporating glass beads, and to a method of applying a reflective marking to a surface.

2. Description of the Background

The present invention is principally concerned with the properties of glass beads which are to be incorporated into a polymeric matrix and which contact the material which is to form the matrix while that material is in the liquid state. The material which is to form the matrix may be in the form of a melt, a solution, or a dispersion, and it may be polymeric or polymerisable.

Glass beads may be incorporated into synthetic polymeric material for a variety of purposes, for example as fillers in thermoplastics materials and in thermosetting resins in order to modify the properties of the material or to facilitate moulding, and in order to give light-reflecting properties to paints. When used as filler in thermoplastics and thermosetting materials, it is often desirable that the beads should be evenly distributed throughout the final product in order to give uniformity of properties, and this implies that the beads should be uniformly distributed in the liquid material from which the product is moulded. Even where uniform distribution is not desired, it is in general true to say that there will be some optimum distribution of the filler material in the finished product and thus in the liquid from which it is moulded.

Certain analogous problems arise in connexion with paints which may be applied to form road markings, for example to divide a carriageway into different traffic lanes or to indicate traffic priorities at road junctions. It is desirable that such markings should be highly visible at night, and one way of promoting high visibility is to incorporate glass beads into the markings to reflect light from a vehicle's lamps back to the driver of that vehicle. It will of course be appreciated that in order to exhibit this effect, at least some of the glass beads must be well exposed at the surface of the marking. If the beads are exposed, there is a risk that they may be removed as traffic is driven over the marking, with the result that during the course of time, more and more beads are removed so that the marking becomes less and less reflective and so less clearly visible at night. It is therefore desirable that the beads should be distributed through the thickness of the paint in order to maintain such reflectivity for as long as possible. On the other hand, if reflective paint is to be used in circumstances where it will not be exposed to such a degree of wear, for example as in road signs, it is desirable that the beads should be mainly at the surface of the paint, though sufficiently well bonded to it to resist weathering.

It is an object of the present invention to provide a method of modifying the wettability of glass beads so as to render them especially suitable for use as referred to above.

SUMMARY OF THE INVENTION

According to the present invention, there is provided a method of modifying the wettability of glass beads, characterised in that such beads are coated with a mixture of substances which mixture comprises a first substance which if used alone would tend to make the beads hydrophobic while leaving them oleophilic and a second substance which if used alone would tend to make the beads both hydrophobic and oleophobic.

The present invention also extends to a glass bead, characterised in that its surface bears a coating of a mixture of substances which mixture comprises a first substance which if present alone would tend to make the bead hydrophobic while leaving it oleophilic and a second substance which if present alone would tend to make the bead both hydrophobic and oleophobic.

The present invention also includes a synthetic polymeric matrix incorporating glass beads, characterised in that at least some of such beads are glass beads as herein defined.

Embodiments of the invention wherein such matrix is a paint are especially preferred.

The present invention also extends to a method of applying a reflective marking to a surface, characterised in that such method comprises applying paint to an area to be marked and then distributing over the painted area while the paint is still wet, glass beads at least some of which are glass beads according to the invention as hereinbefore defined.

DESCRIPTION OF THE PREFERRED EMBODIMENTS

We have found that by operating in accordance with the present invention, it is possible easily to regulate the extent to which the thus treated glass beads will be wetted by liquid polymer forming or polymer containing materials, so that the extent of their exposure at the surface of a product formed by setting of such material (for example by curing or by elimination of solvent or dispersing phase) and the distribution of the treated glass beads in that material can be controlled in a simple manner while imparting good adherence between the treated beads and that material after setting to form the product. As a result, by a selection of the substances used for treating the beads, and the extent of such treatment, it is possible to achieve, for example with a variety of paints, a marking in which glass beads are well exposed for reflection but are also well bonded to the paint so that they resist weathering, or which are distributed throughout the thickness of the paint so that as successive strata of paint are eroded thus removing some of the beads, fresh beads are exposed in underlying paint strata. As an alternative, it is possible to achieve a substantially uniform distribution of the beads throughout a polymeric product formed from liquid material, for example by moulding a thermoplastics or thermosetting material.

The relative extent to which the beads are treated by the first substance and the second substance can easily be controlled by adjusting the composition of the treatment medium. In general, the more uniform is the distribution required of the coated beads in a given polymeric material, the lower should be the surface tension difference between the coated beads and the liquid material. It is surprising that a wide range of surface tensions, intermediate between those which would be imparted by coating the beads with either of said first and second substances alone, can be achieved despite a marked preponderance of one or other of those substances in the bead coatings.

Advantageously, said first substance comprises a silane. Oleophilic silanes are very efficacious for the purposes in view because they can promote bonding between the beads and various polymeric materials, for example based on acrylics, polyvinyl butyral or rubbers which are present in some paints.

It is particularly preferred that said silane is selected from γ-methacryloxypropyltrimethoxysilane, γ-aminopropyltriethoxysilane, phenyltrimethoxysilane, and methyltrimethoxysilane. These silanes are especially useful for promoting wetting of coated glass beads by a variety of organic materials including in particular solvents commonly used in synthetic resin paint materials.

Preferably, said second substance is a fluorocarbon compound. Fluorocarbon compounds are particularly useful as control agents for limiting the wettability of glass beads by various organic materials. For the best results, it is preferred to use a said second substance which is an anionic fluorocarbon compound, and optimally, said second substance is a fluoro-alkyl-sulphonate.

Advantageously, said mixture contains at least twice as much by weight of said second substance as it does of said first substance. It has been found that the use of said substances in such proportions gives especially good results when the coated beads are later incorporated in paints to form road markings.

The invention includes glass beads treated by a method as herein defined.

The present invention also extends to a glass bead, characterised in that its surface bears a coating of a mixture of substances which mixture comprises a first substance which if present alone would tend to make the bead hydrophobic while leaving it oleophilic and a second substance which if present alone would tend to make the bead both hydrophobic and oleophobic. Such beads are useful inter alia for incorporation into a variety of polymeric matrix materials. As an example may be mentioned reflective paints to render markings made with such paints more highly visible, especially at night. By varying the proportions of first and second substances on the surfaces of such beads, it is possible easily to regulate the extent to which the beads will be wetted by a paint, so that the extent of their exposure at the surface of a layer of such paint can be controlled in a simple manner. As a result, by a selection of the substances applied to the surfaces of the beads, and the quantities and relative proportions so applied, it is possible to achieve, with a variety of paint materials, a marking in which glass beads are well exposed for reflection but are also well bonded to the paint so that they resist weathering, or which are distributed throughout the thickness of the paint so that as successive strata of paint are eroded thus removing some of the beads, fresh beads are exposed in underlying paint strata. As an alternative, it is possible to achieve a substantially uniform distribution of the beads throughout a polymeric product formed from liquid material, for example by moulding a thermoplastics or thermosetting material.

Advantageously, said first substance comprises a silane. Oleophilic silanes are very efficacious for the purposes in view.

It is particularly preferred that said silane is selected from γ-methacryloxypropyltrimethoxysilane, γ-aminopropyltriethoxysilane, phenyltrimethoxysilane, and methyltrimethoxysilane. These silanes are especially useful for promoting wetting of coated glass beads by a variety of organic materials including in particular solvents commonly used in synthetic resin paint materials.

Preferably, said second substance is a fluorocarbon compound. Fluorocarbon compounds are particularly useful as control agents for limiting the wettability of glass beads by various organic materials. For the best results, it is preferred to use a second substance which is an anionic fluorocarbon compound, and optimally, said second substance is a fluoro-alkyl-sulphonate, for example a fluoro-alkyl-sulphonate in which the alkyl has a long chain ($C_{14}$ to $C_{18}$).

Advantageously, said coating contains at least twice as much by weight of said second substance as it does of said first substance. The adoption of this preferred feature promotes the achievement of surface properties of the treated beads which are especially beneficial for many of the purposes in view.

The present invention also includes a synthetic polymeric matrix incorporating glass beads, characterised in that at least some of such beads are glass beads as herein defined. Such materials are useful for a wide variety of purposes. As one example, may be cited the use of a paint forming a marking in which glass beads are exposed for reflection but are also well bonded to the paint so that they resist erosion. The degree of exposure and thus the reflectance and the degree of erosion resistance may readily be adjusted by suitably selecting the relative proportions of the said first and second substances with which the beads are coated. As another example may be cited the use of articles of moulded thermoplastics or thermosetting materials filled with glass beads as herein defined. Such articles have increased wear resistance.

Preferably, such matrix incorporates at least two batches of beads having different surface properties. By the adoption of this feature, it is possible to achieve even greater control over the distribution of the beads in the matrix. For example one can ensure that beads of the different batches will lie at different mean levels in a layer of paint applied to form a marking. As a result, if the paint layer should become worn during use, even though glass beads at the original exposed surface may become detached from the layer, beads which were originally at a lower level in the layer will become progressively exposed so tending to maintain the reflectivity of the marking. Each of the different batches of beads incorporated in such matrix may be a batch of beads in accordance with this invention, or one or more batches of beads may have been treated in some other way. Indeed one of such batches of beads may be untreated.

Embodiments of the invention wherein such matrix is a paint are especially preferred.

The present invention also extends to a method of applying a reflective marking to a surface, characterised in that such method comprises applying paint to an area to be marked and then distributing over the painted area while the paint is still wet, glass beads at least some of which are glass beads according to the invention as hereinbefore defined. This is a very simple method of applying a said marking. On distribution, the beads will sink into the still wet paint layer to an extent determined by any surface treatment to which they may have been subjected, and it is easy to regulate such a treatment to give a marking in which glass beads are exposed for reflection but are also well bonded to the paint so that they resist erosion.

Preferably, the distributed beads are a mixture of at least two batches of beads having different surface properties, so as to give a marking in which the different batches of beads lie at different mean levels, since this is found to prolong reflectivity of the marking.

The present invention is particularly useful for applying a said reflective marking to a surface of a road.

Various preferred embodiments of the invention will now be described by way of example.

EXAMPLES

In the examples, glass beads whose grain size was between 200 μm and 600 μm and which had a specific surface of 0.015 m$^2$/cm$^3$ were mixed with a treatment medium which was a solution in methanol of the substances indicated in the following Table I.

The following Table I shows the results of a wettability test on various samples of beads treated in various different ways. The test was performed by placing a layer of beads in a shallow dish and carefully introducing one or other of various common solvents. In most cases a proportion of the beads was not wetted by the solvent, so those beads floated due to surface tension effects. The percent proportion of floating beads is shown for the various treatments and the various solvents used. The quantities of the respective treatment agents used expressed in grams per kilogram of beads are also indicated.

TABLE I

| Hydrophobic, oleophilic substance amount | Hydrophobic, oleophobic substance amount | Aliphatic hydrocarbon solvent | Aromatic hydrocarbon solvent | |
|---|---|---|---|---|
| | | proportion floating | | |
| 0.04 | 0* | 0 | 0 | A |
| 0.04 | 0.008 | 0 to 40 | 50 | B |
| 0.04 | 0.012 | 10 to 65 | 80 to 95 | C |
| 0.04 | 0.020 | 20 to 80 | 50 to 95 | D |
| 0.08 | 0* | 0 | 0 | E |
| 0.08 | 0.008 | 0 to 2 | 8 to 15 | F |
| 0* | 0.090 | 70 to 100 | 100 | G |
| 0* | 0.192 | 65 to 100 | 100 | H |

Notes
*Not according to the invention.

The hydrophobic but oleophilic substance is a γ-aminopropyltriethoxysilane (for example A1100 from Union Carbide), a γ-methacryloxypropyltrimethoxysilane, a phenyltrimethoxysilane, or a methyltrimethoxysilane.

The hydrophobic and oleophobic substance is a potassium fluoroalkyl-sulphonate (for example FC129 from 3M).

The aliphatic hydrocarbon solvent is for example hexane or heptane, and the aromatic hydrocarbon solvent is for example toluene or xylene.

Reflective markings were applied to a tarmacadam surface by applying thereto an acrylic paint containing a mixture of at least some of the organic solvents given in Table I to a thickness corresponding to application rates expressed in g/m$^2$ and then sprinkling glass beads which had been subjected to one of the treatments A to H in Table I onto the still wet paint surface. The beads were applied at various rates as shown in the following Table II also expressed in g/m$^2$. Table II also gives results in terms of the reflectivity of the thus formed markings, expressed in mCd/Lx.m$^2$, R1 being the result almost immediately on drying of the paint, and R2 being the result some three weeks later after the markings had been subjected to wear and weathering. The measurements were made using an apparatus available under the Trade Mark ECOLUX from Laboratoire Central des Ponts et Chaussées, 58 Boulevard Lefebvre, 75732 Paris Cedex 15, France. This apparatus is designed to project a beam of light down onto a horizontal road surface at an angle of 3° 30' and to detect the intensity of light retro-reflected from that surface at an angle of 4° 30', to simulate the illumination provided to a vehicle driver by the headlamps of the vehicle.

TABLE II

| Beads | Bead density | Paint density | R1 | R2 |
|---|---|---|---|---|
| B | 260 g/m$^2$ | 560 g/m$^2$ | 275 | 271 |
| C | 340 | 570 | 384 | 375 |
| D | 150 | 570 | 363 | 345 |
| A* | 260 | 570 | 151 | 154 |
| (3)* | 260 | 530 | 262 | 233 |

Notes
*Not according to the invention.
(3) Silicone coated. Silicone coating treatments are known to render glass beads hydrophobic and oleophobic.

These results show that by the adoption of the present invention, it is possible to produce road markings which have good reflectivity and which maintain good reflectivity for a useful period of time.

It was also found that the markings made using samples C and D were in particular able to maintain good reflectivity even after three months wear during winter weather when they were exposed to the particularly heavy abrasion which is caused by the use of studded winter road tyres. It is noted that the markings made using beads A gave poor reflectivity, though this did tend to improve slightly at first, but after the exposure referred to, the markings were substantially completely abraded. The silicone treated beads gave good initial reflectivity, but they were rapidly eliminated from the paint layer by the passage of traffic over them.

Tests have also been made with markings formed by an acrylic paint applied to a substrate as an aqueous emulsion. Visual inspection, and reflectivity measurements showed that markings formed by such paint containing beads according to the invention have good reflectivity and maintain that property for a useful period of time.

Various mixtures of bead samples have also been made up as indicated in the following Table III.

TABLE III

| MIXTURE | BEADS | WT % | BEADS (Note 4) | WT % | BEADS | WT % |
|---|---|---|---|---|---|---|
| i | G | 30 | B | 40 | E | 30 |
| ii | H | 40 | C | 30 | E | 30 |
| iii | | | D | 50 | Untreated | 50 |
| iv | (Note 3) | 50 | B | 50 | | |
| v | | | B | 50 | E | 50 |
| vi | | | C | 50 | | |
| | | | D | 50 | | |

Notes
3 Silicone coated.
4 The fraction of beads in this column is according to the invention. The fractions in the other columns are not, on their own, according to the invention.

Other mixtures of beads may readily be made up to suit various different purposes.

Glass beads according to the invention have been manufactured specifically for use as a filler material for polyethylene. In order to keep the surface tension difference between the coated beads and molten polyethylene low, so as to promote uniformity of the distribution of the beads in the polyethylene matrix, the beads were coated with a mixture of fluorocarbon compound FC129 and γ-methacryloxypropyltrimethoxysilane A 174 (from Union Carbide) containing by weight 90% A174 and 10% FC129.

I claim:

1. A method of regulating the wettability of glass beads, comprising:

coating glass beads with a mixture of substances which mixture comprises a first substance which if used alone would tend to make the beads hydrophobic while leaving them oleophilic and a second substance which if used alone would tend to make the beads both hydrophobic and oleophobic; said first and second substances being present in a proportion effective to attain a desired degree of wettability or bonding to a medium with which said coated beads are to be admixed.

2. A method according to claim 1, wherein said first substance comprises a silane.

3. A method according to claim 2, wherein said silane is selected from γ-methacryloxypropyltrimethoxysilane, γ-aminopropyltriethoxysilane, phenyltrimethoxysilane, and methyltrimethoxysilane.

4. A method according to claim 1, wherein said second substance is a fluorocarbon compound.

5. A method according to claim 4, wherein said second substance is an anionic fluorocarbon compound.

6. A method according to claim 5, wherein said second substance is a fluoro-alkyl-sulphonate.

7. A method according to claim 1, wherein said mixture contains at least twice as much by weight of said second substance as it does of said first substance.

8. Glass beads treated by a method according to claim 1.

9. A glass bead coated with a mixture of substances comprising a first substance which if present alone would tend to make the bead hydrophobic while leaving it oleophilic and a second substance which if present alone would tend to make the bead both hydrophobic and oleophobic; said first and said second substance being present in a proportion effective to attain a desired degree of wettability or bonding to a medium with which said coated beads are to be admixed.

10. A bead according to claim 9, wherein said first substance comprises a silane.

11. A bead according to claim 10, wherein said silane is selected from γ-methacryloxypropyltrimethoxysilane, γ-aminopropyltriethoxysilane, phenyltrimethoxysilane, and methyltrimethoxysilane.

12. A bead according to claim 9, wherein said second substance is a fluorocarbon compound.

13. A bead according to claim 12, wherein said second substance is an anionic fluorocarbon compound.

14. A bead according to claim 13, wherein said second substance is a fluoro-alkyl-sulphonate.

15. A bead according to claim 9, wherein said coating contains at least twice as much by weight of said second substance as it does of said first substance.

16. A synthetic polymeric matrix, comprising:

glass beads according to claim 9.

17. A synthetic polymeric matrix according to claim 16, wherein such matrix incorporates at least two batches of beads having different surface properties.

18. A synthetic polymeric matrix according to claim 16, wherein such matrix is a paint.

19. A method of applying a reflective marking to a surface, comprising:

applying paint to an area to be marked and then distributing over the painted area while the paint is still wet, glass beads at least some of which are glass beads according to claim 9.

20. A method according to claim 19, wherein the distributed beads are a mixture of at least two batches of beads having different surface properties.

21. A method according to claim 19, wherein said reflective marking is applied to a surface of a road.

* * * * *